US011822978B2

(12) United States Patent
Karri et al.

(10) Patent No.: US 11,822,978 B2
(45) Date of Patent: Nov. 21, 2023

(54) MANAGEMENT OF CONTENT TRANSFER (71) Applicant: INTERNATIONAL BUSINESS MACHINES CORPORATION, Armonk, NY (US)

(72) Inventors: Venkata Vara Prasad Karri, Visakhapatnam (IN); Sarbajit K. Rakshit, Kolkata (IN); Sri Harsha Varada, Vizianagaram (IN)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 17/455,419

(22) Filed: Nov. 18, 2021

(65) Prior Publication Data
US 2023/0153180 A1 May 18, 2023

(51) Int. Cl.
G06F 13/00 (2006.01)
G06F 9/54 (2006.01)

(52) U.S. Cl.
CPC .................... G06F 9/543 (2013.01)

(58) Field of Classification Search
CPC ....................................... G06F 9/543
See application file for complete search history.

(56) References Cited

U.S. PATENT DOCUMENTS

| 8,090,406 | B2 | 1/2012 | Hawkins |
| 9,184,800 | B2 | 11/2015 | Hamilton |
| 9,639,163 | B2 | 5/2017 | Cheng |
| 10,254,935 | B2 | 4/2019 | Mazzocchi |
| 11,010,211 | B2 | 5/2021 | Chen |
| 2009/0327468 | A1* | 12/2009 | Hirsch ............... G06F 9/485 |
| | | | 709/223 |

(Continued)

FOREIGN PATENT DOCUMENTS

| CN | 108780453 A | 11/2018 |
| CN | 109997111 A | 7/2019 |

OTHER PUBLICATIONS

Turner et al., "Cross-Device Gaze-Supported Point-to-Point Content Transfer", https://www.perceptualui.org/publications/turner14_etra.pdf, ETRA, Mar. 26-28, 2014, pp. 1-8.

(Continued)

Primary Examiner — Kevin L Young
Assistant Examiner — Abdou K Seye
(74) Attorney, Agent, or Firm — Tihon Poltavets (57) ABSTRACT A method for transferring content utilizing contextual positioning includes receiving a content selection for transferring from an originating device. The method also includes determining contextual positioning in a user interface of the originating device for each portion of the content selection, wherein the contextual positioning is based on the content selection and one or more objects in the user interface of the originating device. The method also includes sending, to a receiving device, each portion of the content selection with the determined contextual positioning in the user interface of the originating device. The method also includes placing, in the user interface of the receiving device, each portion of the content selection is based on the determined contextual positioning in the user interface of the originating device.

18 Claims, 6 Drawing Sheets

(56) References Cited

U.S. PATENT DOCUMENTS

| | | | |
|---|---|---|---|
| 2011/0096174 A1* | 4/2011 | King | H04N 1/00244 |
| | | | 348/207.1 |
| 2013/0036167 A1* | 2/2013 | Bazot | G06F 9/543 |
| | | | 709/204 |
| 2013/0046935 A1* | 2/2013 | Ramanathan | G06F 16/172 |
| | | | 711/119 |
| 2013/0238744 A1 | 9/2013 | Paschke | |
| 2016/0140682 A1* | 5/2016 | Berstis | G06F 3/0482 |
| | | | 715/748 |
| 2016/0342449 A1* | 11/2016 | Wong | H04L 67/1097 |
| 2019/0325016 A1 | 10/2019 | Nicholson | |
| 2020/0007921 A1 | 1/2020 | Ojala | |
| 2020/0356221 A1 | 11/2020 | Behzadi | |
| 2021/0058758 A1* | 2/2021 | Carter | G06F 3/014 |

OTHER PUBLICATIONS

Anguilar, "Get a 'Select All' button for Webpages in Safari on your iphone", https://ios.gadgethacks.com/how-to/get-select-all-button-for-webpages-sa . . . , Nov. 30, 2020, pp. 1-9.

Apple Support, "How to use AirDrop on your IPhone, IPad, or IPod Touch", https://support.apple.com/en-in/HT204144, accessed Jul. 20, 2021,pp. 1-3.

Mell et al., "The NIST Definition of Cloud Computing", National Institute of Standards and Technology, Special Publication 800-145, Sep. 2011, pp. 1-7.

International Searching Authority, "Notification of International Search Report and Written Opinion or Declaration", International Application No. PCT/CN2022/131327, dated Jan. 20, 2023, 9 pages.

Karri et al., "Management of Content Transfer", International Application No. PCT/CN2022/131327, International Filing Date Nov. 11, 2022, 41 pages.

* cited by examiner

MANAGEMENT OF CONTENT TRANSFER

BACKGROUND

This disclosure relates generally to managing content transfer, and in particular to managing content transfer between electronic devices utilizing contextual positioning.

Short-range wireless communication allows for two electronic devices to exchange data, as long as the two electronic devices are located within close proximity with one another. A user operating an originating electronic device can select data (e.g., digital content) for sharing with another user operating a receiving electronic device, where the receiving electronic device is located with a predetermined proximity to the originating device. Presently, the user of the receiving electronic device can accept the data being shared and subsequently, the receiving electronic device displays the data being shared to the user.

SUMMARY

Embodiments in accordance with the present invention disclose a method, computer program product and computer system for managing content transfer utilizing contextual positioning, the method, computer program product and computer system can receive a content selection for transferring from an originating device. The method, computer program product and computer system can determine contextual positioning in a user interface of the originating device for each portion of the content selection, wherein the contextual positioning is based on the content selection and one or more objects in the user interface of the originating device. The method, computer program product and computer system can send, to a receiving device, each portion of the content selection with the determined contextual positioning in the user interface of the originating device. The method, computer program product and computer system can place, in the user interface of the receiving device, each portion of the content selection is based on the determined contextual positioning in the user interface of the originating device.

DETAILED DESCRIPTION

Embodiments of the present invention manage content transfer between electronic devices utilizing contextual positioning. While transferring contenting between an originating device and a receiving device, embodiments of the present invention provide an option to a user of the originating device to utilize contextual positioning when transferring the content. Contextual positioning is based on the content being transferred to the receiving device and a position of the content relative to one or more objects on the originating device. As the content is transferred between the originating device and the receiving device, a contextual position is maintained for the content upon receipt at the receiving device. Based on historical content transferring patterns of a user between two associated devices, iterative learning is utilized to predict when the user transfers content between two associated devices (i.e., the originating device and the receiving device) and applies contextual positioning for the content being transferred. As the user interacts with a first device, embodiments of the present invention identify completed activities and pending activities relative to the content being interacted with on the first device. As the user completes an activity, the activity is transferred from the first device (i.e., originating device) to a second device (i.e., receiving device), where contextual positioning allows for the completed activity to appear in a similar position in the second device.

Embodiments of the present invention can identify and highlight portions of the content being transferred, where the highlighted portions include identified contextual positioning information. The user can select whether to transfer the highlighted portions of the content based on the identified contextual positioning information and can alter a positioning of the highlight portions of the content upon transferring to the receiving device. Embodiments of the present invention can display a user interface of the receiving device in the originating device, where the user can assign the portions of the content being transferred to one or more positions in the user interface on the receiving device. If a first user interface on the originating device is displaying a different webform than a second user interface on the receiving device, embodiments of the present invention performs contextual analysis on the content and a position of the content relative to one or more objects in the first user interface and transfers the content to one or more positions on the second user interface on receiving device based on the contextual analysis. Embodiments of the present invention can also anticipate a depletion of battery power at the originating power and initialize a transfer of the content selection to the receiving device.

Figure 1:
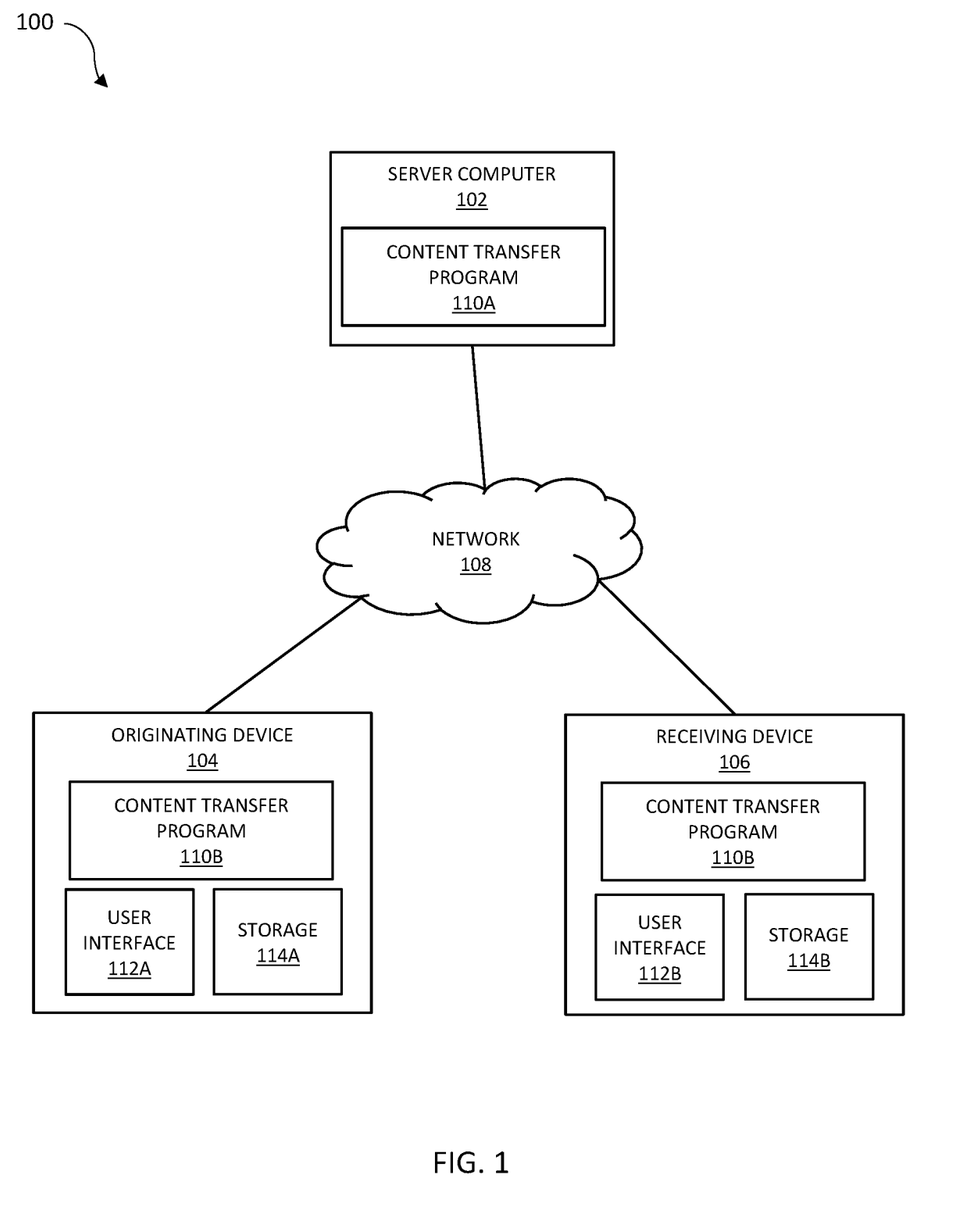
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment includes server computer 102, originating device 104, and receiving device 106 all interconnected over network 108. Server computer 102 can be a standalone computing device, a management server, a web server, a mobile computing device, or any other electronic device or computing system capable of receiving, sending, and processing data. In other embodiments, server computer 102 can represent a server computing system utilizing multiple computers as a server system, such as in a cloud computing environment. In another embodiment, server computer 102 can be a laptop computer, a tablet computer, a netbook computer, a personal computer (PC), a desktop computer, a smart phone, or any programmable electronic device capable of communicating with originating device 104 and receiving device 106, and other computing devices (not shown) within the distributed data processing environment via network 108. In another embodiment, server computer 102 represents a computing system utilizing clustered computers and components (e.g., database server computers, application server computers, etc.) that act as a single pool of seamless resources when accessed within the distributed data processing environment. Server computer 102 includes server-side content transfer program 110A for managing content transfer between originating device 104 and receiving device 106. Server computer 102 may include internal and external hardware components, as depicted and described in further detail with respect to FIG. 4.

Originating device 104 and receiving device 106 can each be a laptop computer, a tablet computer, a desktop computer, a smart phone, a smart watch, or any programmable electronic device capable of communicating with various components and devices within the distributed data processing environment (e.g., server computer 102) via network 108. Originating device 104 and receiving device 106 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, originating device 104 and receiving device 106 each represent one or more programmable electronic devices or combination of programmable electronic devices capable of executing machine readable program instructions and communicating with other computing devices (not shown) within the distributed data processing environment via a network, such as network 108. In one embodiment, originating device 104 and receiving device 106 represent two devices associated with a single user. Originating device 104 and receiving device 106 include user interface 122A and 112B, respectively, for interacting with directional content transfer program 110A on server computer 102 and content transfer program 110B on originating device 104 and receiving device 106. Originating device 104 and receiving device 106 also include storage 114A and 114B, respectively. Storage 114A and 114B is a local repository for storing various data (e.g., media content) on originating device 104 and receiving device 106.

Network 108 can be, for example, a telecommunications network, a local area network (LAN), a wide area network (WAN), such as the Internet, or a combination of the three, and can include wired, wireless, or fiber optic connections. Network 108 can include one or more wired and/or wireless networks capable of receiving and transmitting data, voice, and/or video signals, including multimedia signals that include voice, data, and video information. In general, network 108 can be any combination of connections and protocols that will support communications between server computer 102, originating device 104, receiving device 106, and other computing devices (not shown) within the distributed data processing environment.

Content transfer program 110 manages content transfer between originating device 104 and receiving device 106 utilizing contextual positioning. As mentioned above, in one embodiment, content transfer program 110A operating on server computer 102 manages content transfer between originating device 104 and receiving device 106 utilizing contextual positioning. In another embodiment, content transfer program 110B operating on originating device 104 and/or content transfer program 110B operating on receiving device 106 manage content transfer between originating device 104 and receiving device 106 utilizing contextual positioning. Content transfer program 110 receives content selection in user interface 112A for transferring from originating device 104. Content transfer program 110 identifies a receiving device (i.e., receiving device 106) for the content selection and determines contextual positioning information for the content selection based on the content being transferred to receiving device 106 and a position of the content relative to one or more objects in user interface 112A of originating device 104. Content transfer program 110 sends the content selection with contextual position from originating device 104 to receiving device 106, where each portion of the content positioned in user interface 112A is transferred to a similar position in user interface 112B based on the determined contextual positioning.

In the event content transfer program 110 determines a transfer conflict is not present between originating device 104 and receiving device 106, content transfer program 110 concludes sending all portions of the content selection to receiving device 106. In the event content transfer program 110 determines a transfer conflict is not present between originating device 104 and receiving device 106, content transfer program 110 receives a user specified position in user interface 112B of receiving device 106 for a portion of the content selection being transferred from originating device 104. In the event content transfer program 110 determines the transfer conflict was resolved, content transfer program 110 concludes sending all portions of the content selection to receiving device 106. In the event content transfer program 110 determines the transfer conflict was not resolved, content transfer program 110 suspends the transfer of the portion of the content selection with conflict between originating device 104 and receiving device 106.

User interface 112A on originating device 104 and user interface 112B on receiving device 106 enables a user to make requests of or issue commands to server computer 102 via network 108. User interface 112A and 112B each enable the user to receive information and instructions in response on originating device 104 and receiving device 106, respectively. In one embodiment, a user of originating device 104 and receiving device 106 accesses respective user interface 112A and 112B via voice commands in natural language. In one embodiment, user interface 112A and 112B may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 112A and 112B enables a user of originating device 104 and receiving device 106 to interact with each instance of content transfer program 110A operating on server computer 102 and content transfer program 110B operating on originating device 104 and receiving device 106.

Figure 2:
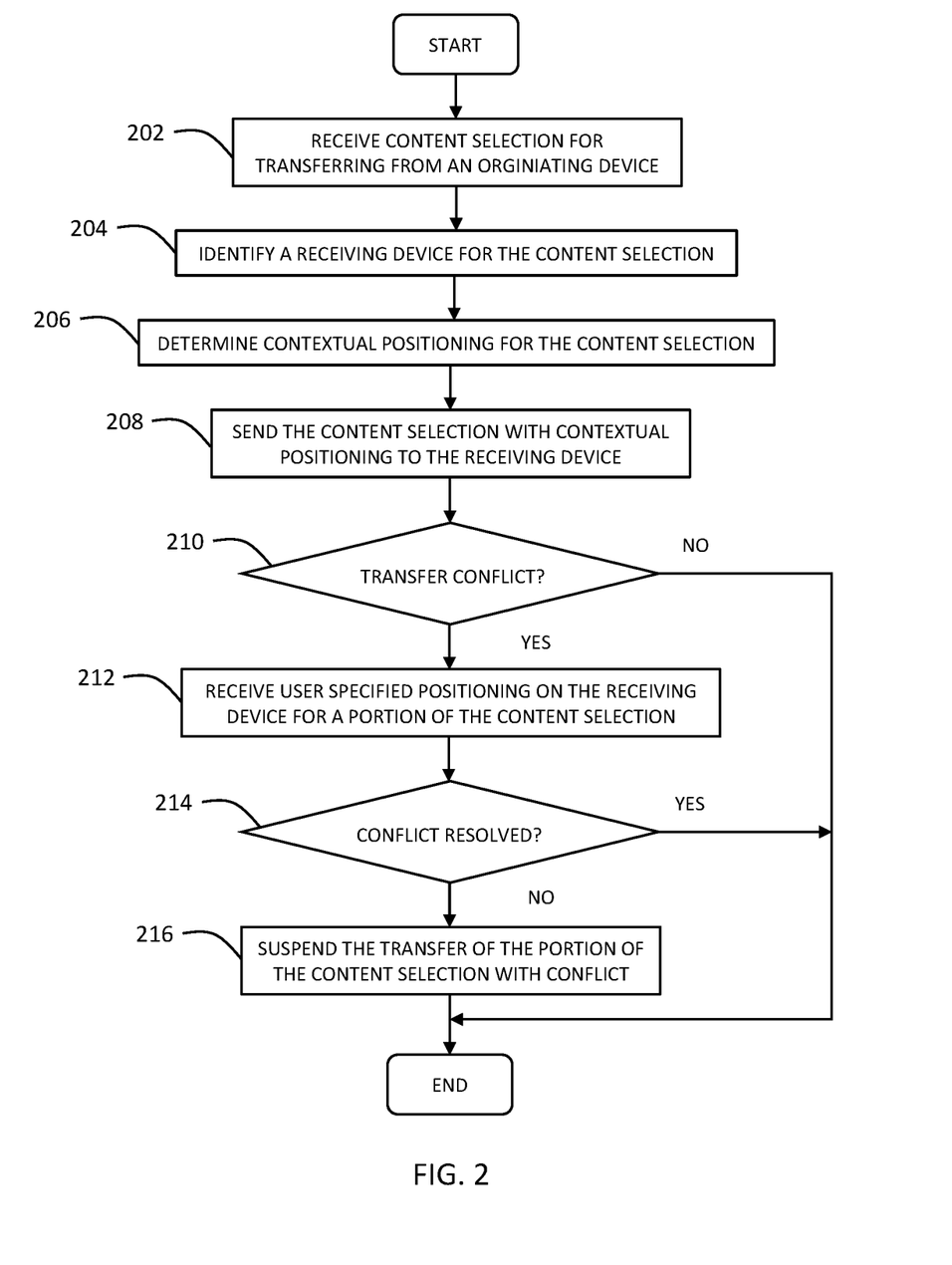
FIG. 2 depicts a flowchart for a content transfer program for sending content utilizing contextual positioning, in accordance with an embodiment of the present invention.

FIG. 2 depicts a flowchart for a content transfer program for sending content utilizing contextual positioning, in accordance with an embodiment of the present invention.

Content transfer program 110 receives content selection for transferring from an originating device (202). The originating device represents a first electronic device from which the content is being transferred to a second electronic device, where the second electronic device is designated the receiving device. The content can be an image file, a video file, an audio file, a graphics interchange format file, text, text file, spreadsheet file, a hyperlink, and any other type of content transferrable (i.e., shareable) between two devices. In one embodiment, content transfer program 110 receives the content selection for transferring from the originating device via a user input in a user interface on the originating device, where the content selection includes one or more portions. For example, a user associated with the originating device is filling out a form on the originating device and inputting various information into the form, where the originating device is mobile phone. However, during the process of filling out the form, the user associated with the originating device decides to continue filling out the form on another device (e.g., tablet computer). Content transfer program 110 receives content selection for transferring from the originating device via a user input, where the user selects the content that includes text from multiple portions of the fillable form and a text file attachment.

In another embodiment, content transfer program 110 identifies a fillable form on the originating device and identifies the text from multiple portions of the fillable form and a text file attachment that the user provided when interacting with the fillable form. Content transfer program 110 highlights the multiple portions of the fillable form with the user provided text and the text file attachment, while providing a user interface option for the user to select which of the highlighted multiple portions of the fillable form and the text file attachment are for transferring from the originating device. In yet another embodiment, content transfer program 110 utilizes iterative historical machine learning to identify patterns for when a user selects content to transfer to transfer from an originating device. In an example, a user performs a maintenance checklist on a tablet computer while inspecting various server equipment at a client site, where the user inspects the server equipment at the client site once a week. As the user inputs maintenance information (i.e., content) into the maintenance checklist on the table computer, the user transfers from the tablet computer to another computer device located in a drawer on a server rack upon reaching a particular point in the maintenance checklist, where the user continues performing the maintenance checklist on the other computer device. Content transfer program 110 has the ability to identify the pattern of when the user switches from the tablet computer to the other computer device and select the content (i.e., inputted maintenance information from the maintenance checklist) to transfer from the tablet computer (i.e., originating device).

Content transfer program 110 identifies a receiving device for the content selection (204). In this embodiment, content transfer program 110 identifies any device capable of receiving the content selection in a vicinity of the originating device in which the content was selected. Content transfer program 110 utilizes short distance, also referred to as short-range, wireless communication to identify visible devices within the vicinity of the originating device. The visible devices represent possible receiving devices with security settings which allow for the identifying and transferring of content from the originating device to a selected receiving device. In one embodiment, content transfer program 110 identifies the visible devices in a vicinity of an originating device, displays a list of the visible devices to a user of the originating device, and receives a user selection of a receiving device from the list of the visible device for transferring the content selection from the originating device. In another embodiment, content transfer program 110 identifies a receiving device associated with the user operating the originating device, where both the originating device and receiving device belong to a single user. Content transfer program 110 can also utilize iterative historical machine learning to identify patterns for identifying a receiving device for transferring the selected content from the originating device. In the example where the user performs a weekly maintenance checklist while inspecting server equipment at a customer site, content transfer program 110 identifies the pattern of the user transferring from the tablet computer to another computer device located in a drawer on server rack. Therefore, content transfer program 110 identifies the other computer device located in drawer in the server rack as the receiving device for the content selection (i.e., inputted maintenance information from the maintenance checklist).

Content transfer program 110 determines contextual positioning for the content selection (206). Content transfer program 110 can utilize a virtual clip board for the content selection, where the virtual clipboard is visible by a user of the originating device. The content selection includes one or more portions, where each of the one or more portions includes associated metadata utilized for providing contextual positioning for the content selection in a user interface of the receiving device. Content transfer program 110 determines the contextual positioning for the one or more portions of the content selection and stores the contextual positioning in the form of metadata with the virtual clipboard. Content transfer program 110 determines the contextual positioning for the one or more portions of the content selection based on the content selection being transferred to the receiving device and a position of the content selection relative to one or more objects in a user interface on the originating device. Content transfer program 110 analyzes the one or more portions of the content selection based on a type of content (e.g., text, image file, audio file) being transferred to the receiving device utilizing natural language processing, digital image processing, and text processing to determine a topic for the one or more portions of the content selection. Content transfer program 110 analyzes a position of the one or more portions of the media content based on identified contextual clues present in a vicinity of each of the one or more portions utilizing natural language processing, digital image processing, and text processing to determine an associated clue for each of the one or more portions of the content selection.

In one example, the content selection includes text from multiple portions of a fillable form and a text file attachment and content transfer program 110 determines contextual positioning for the multiple portions of the fillable form and the text file attachment. Content transfer program 110 analyzes text in each of the multiple portions of the fillable form and determines that the text for the multiple portions includes a first word appearing to be a name, a second word appearing to be another name, a date, a job title, and a company name. Content transfer program 110 also analyzes text in the text file attachment, along with the text of the file attachment, and determines the text file attachment includes a resume. Content transfer program 110 further analyzes a position of the text for each of the multiple portions of the fillable form relative to one or more objects in the user interface on the originating device. Content transfer program 110 determines the first word appearing to be a name is in a text box in a vicinity of a heading in the user interface on the originating device that reads, "First Name". Content transfer program 110 determines the second word appearing to be another name is in a text box in a vicinity of a heading in the user interface on the originating device that reads, "Last Name". Content transfer program 110 determines the date is in a text box in a vicinity of a heading in the user interface on the originating device that reads, "Date of Birth". Content transfer program 110 determines the job title is in a text box in a vicinity of a heading in the user interface on the originating device that reads, "Employment Position". Content transfer program 110 determines the company name is in a text box in a vicinity of a heading in the user interface on the originating device that reads, "Employer". Content transfer program 110 stores the results of analysis as metadata for the text in each of the multiple portions of the fillable form. As for the text file attachment, content transfer program 110 determines the resume file attachment is in a text box in a vicinity of a heading in the user interface on the originating device that reads, "Resume/CV" and stores the results of analysis as metadata for the text file attachment.

In another example, the content selection includes text for inputted maintenance information from a maintenance checklist and content transfer program 110 determines contextual positioning for text for each instance of the inputted maintenance information from the maintenance checklist. Content transfer program 110 analyzes the text for the inputted maintenance information from the maintenance checklist and one or more objects in the user interface of the originating device relative to the text for each instance of the inputted maintenance information. Content transfer program 110 stores the results of analysis as metadata associated with the text for the inputted maintenance information from the maintenance checklist. It is to be noted, as shown in the previously discussed example, the text for each portion of the content selection can vary and contextual positioning of the text for each portion of the content selection is required when transferring the content selection between the originating device and the receiving device. Embodiments of the present inventions transfers text of the one or more portions of the content selection in a user interface of the originating device to a user interface of the receiving device, utilizing the determined contextual positioning for the one or more portions of the content selection.

Content transfer program 110 sends the content selection with contextual positioning to the receiving device (208). To ensure the content selection remains secure, content transfer program 110 encrypts the content selection and contextual position information utilizing one or more cryptographic protocols (e.g., Transport Layer Security). Content transfer program 110 sends the content selection with contextual positioning to the receiving device from the originating device by transferring the data for the content selection and the associated metadata with the contextual positioning information to the receiving device. In one embodiment, content transfer program 110 sends the content selection with contextual positioning by means of close-range wireless communications. In another embodiment, content transfer program 110 sends the content selection with contextual positioning via a server computer of a wireless communications network.

Content transfer program 110 determines whether a transfer conflict is present (decision 210). In the event content transfer program 110 determines a transfer conflict is present ("yes" branch, decision 210), content transfer program 110 receives user specified positioning on the receiving device for a portion of the content selection (212). In the event content transfer program 110 determines a transfer conflict is not present ("no" branch, decision 210), content transfer program 110 concludes sending all portions of the content to the receiving device.

As content transfer program 110 sends each of the one or more portions of the content selection, content transfer program 110 places and displays each of the one or more portions of the content selection into one or more areas (e.g., fields) in a user interface on the receiving device based on the contextual positioning information. A transfer conflict occurs when content transfer program 110 is prevented from placing and displaying at least one of the one or more portion of the content selection being transferred to the receiving device. In one example, a transfer conflict occurs when content transfer program 110 determines content already exists in an area of the user interface of the receiving device where a portion of the content selection is being transferred based on the contextual positioning information. In another example, a transfer conflict occurs when content transfer program 110 determines a portion of the content selection could not be placed and displayed utilizing the contextual positioning information, since the contextual positioning information for the portion did not match one or more objects in the user interface of the receiving device. In yet another example, a transfer conflict occurs if a portion of the content selection being transferred exceeds a size (e.g., dimensions, file size, too many text characters) for an area in the user interface of the receiving device in which the portion of the content selection is to be positioned.

Content transfer program 110 receives user specified positioning on the receiving device for a portion of the content selection (212). For the transfer conflict, content transfer program 110 displays the portion of the content selection that resulted in the transfer conflict in the user interface of the originating device. Furthermore, content transfer program 110 can display, in the user interface of the originating device, an overlay window with a user interface of the receiving device. If the transfer conflict occurred because content was already present in an area of the user interface of the receiving device for receiving the portion of the content selection, content transfer program 110 highlights the area where the conflict occurred in the overlay window with the user interface of the receiving device. Content transfer program 110 queries the user whether to add, replace, or suspend the transfer of the portion of the content selection to the area of the user interface of the receiving device where content is already present. If the transfer conflict occurred because content transfer program 110 could not place and display the portion of the content selection utilizing the contextual positioning information, content transfer program 110 queries the user via the user interface of the originating device to select an area, via the overlay window, in the user interface of the receiving device for placement of the portion of the content selection. If the transfer conflict occurred because content transfer program 110 could not place and display the portion of the content selection due to size (e.g., dimensions, file size, too many text characters), content transfer program 110 queries the user to modify the portion of the content selection that resulted in the transfer conflict. The user can alter the dimensions of the portion of the content selection, reduce a file size of the portion of the content selection, or reduce a number of characters of portion of the content selection, to avoid exceeding a maximum size limit for the portion of the content selection.

Content transfer program 110 determines whether the transfer conflict was resolved (decision 214). In the event content transfer program 110 determines the transfer conflict was not resolved ("no" branch, decision 214), content transfer program 110 suspends the transfer of the portion of the content selection with the conflict (216). In the event content transfer program 110 determines the transfer conflict was resolved ("yes" branch, decision 214), content transfer program 110 concludes sending all portions of the content to the receiving device.

Content transfer program 110 suspends the transfer of the portion of the content selection with the conflict (216). In one embodiment, content transfer program 110 suspends the transfer of the portion of the content selection with the conflict and displays the portion of the content in the user interface of the originating device. Content transfer program 110 can also display an overlay in the user interface of the receiving device with a notification identifying the portion of the content selection with the conflict that was suspended due to an unresolved conflict. In another embodiment, content transfer program 110 suspends the transfer of the portion of the content selection with the conflict to the user interface in the receiving device but sends the portion of the content selection with the conflict to a local storage on the receiving device. The user of the receiving device can access the portion of the content selection and subsequent to performing one or more alteration to resolve the conflict, transfer the portion of the content selection with the conflict to the user interface on the receiving device.

Figure 3:
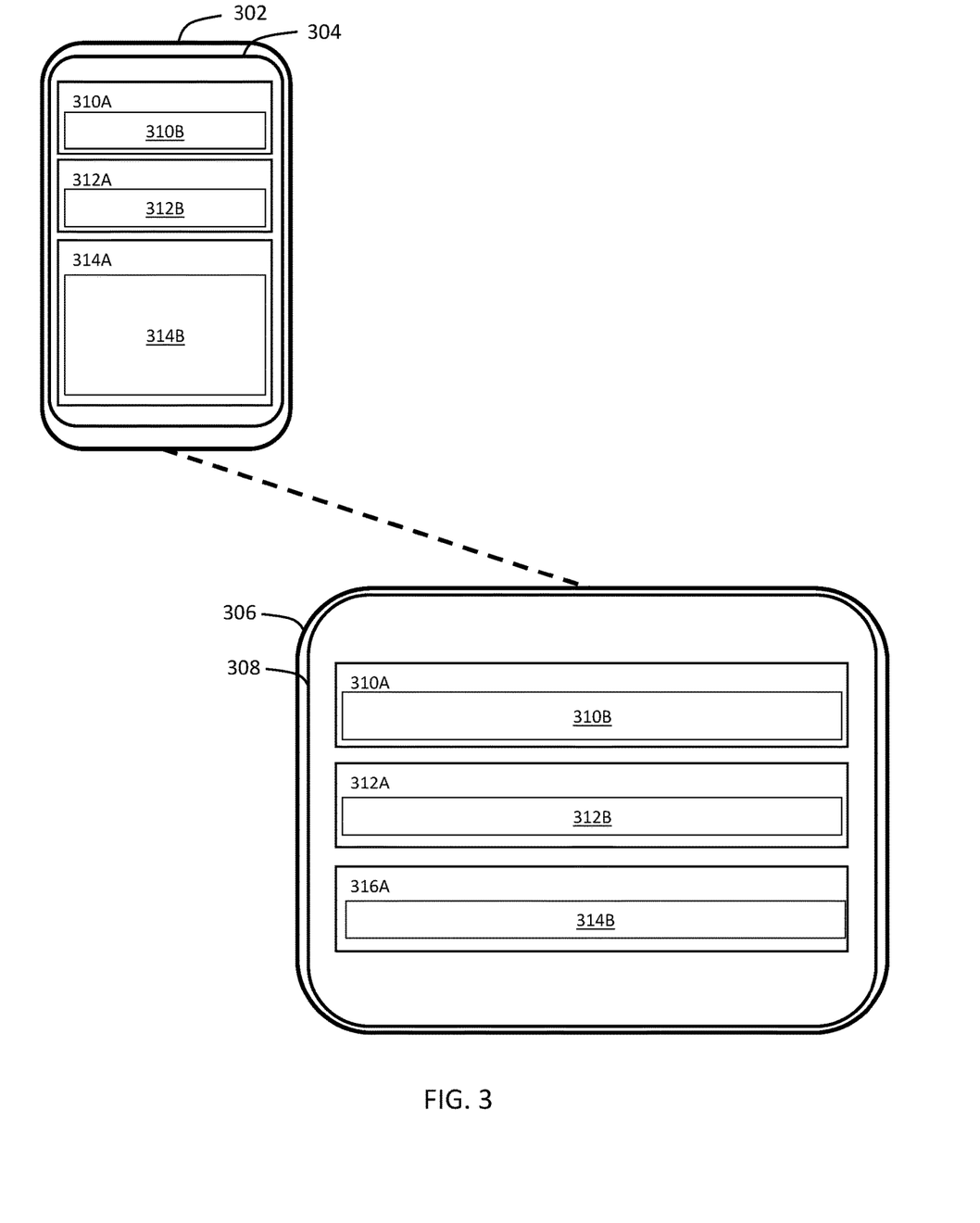
FIG. 3 illustrates an example of a content transfer program transferring content between two electronics device utilizing contextual positioning, in accordance with an embodiment of the present invention.

FIG. 3 illustrates an example of a content transfer program transferring content between two electronics device utilizing contextual positioning, in accordance with an embodiment of the present invention. In this example, a user is performing a maintenance checklist while inspecting various server equipment at a client site, where the user is inputting various content into mobile device 302 with first user interface 304. The user performing the inspection is associated with mobile device 302 with first user interface 304 and tablet computer 306 with second user interface 308, where the user is transferring content from mobile device 302 (i.e., originating device) to tablet computer 306 (i.e., receiving device). First user interface 304 of mobile device 302 includes first heading 310A with first content portion 310B, second heading 312A with second content portion 312B, and third heading 314A with third content portion 314B. Each of first content portion 310B, second content portion 312B, third content portion 314B can include text inputted by the user performing the inspection including summary reports and data logs, along with inspection photos and videos. Content transfer program 110 receives content selection for transferring from mobile device 302 that includes first content portion 310B, second content portion 312B, third content portion 314B.

In this embodiment, content transfer program 110 identifies a receiving device as tablet computer 306 based on historical usage patterns, where the user previously transferred content between mobile device 302 and tablet computer 306 when performing previous inspections of the various equipment at the client site. In another embodiment, content transfer program 110 identifies a receiving device as tablet computer 306 by locating publicly visible devices in a vicinity of mobile device 302 and querying the user for a selection of device from the publicly visible devices as the receiving device. Content transfer program 110 determines contextual position by analyzing the summary reports data logs, inspection photos, and videos of first content portion 310B, second content portion 312B, third content portion 314B and analyzing one or more objects within the vicinity of the content selection (i.e., first heading 310A, second heading 312A, third heading 314A). Content transfer program 110 associates metadata with the contextual positioning for each of first content portion 310B, second content portion 312B, third content portion 314B and sends the content selection with the contextual positioning information to second user interface 308 of tablet computer 306.

Content transfer program 110 sends first content portion 310B and second content portion 312B to second user interface 308 of tablet computer 306, where content transfer program 110 positions first content portion 310B and second content portion 312B under first heading 310A and second heading 312A, respectively, based on the contextual positioning metadata. However, content transfer program 110 identifies a transfer conflict when sending third content portion 314B to second user interface 308 of tablet computer 306, since content transfer program 110 could not identify a placement for based on the contextual positioning metadata associated with third content portion 314B. Content transfer program 110 can query the user to resolves the transfer conflict, which includes transferring third content portion 314B to fourth heading 316A. Content transfer program 110 could not place and display third content portion 314B because third heading 314A is titled, "Notes", but fourth heading 316A is titled, "Additional Comments". Content transfer program 110 allowed the user of mobile device 302 and tablet computer 306 to resolve the discrepancy. Furthermore, content transfer program 110 can utilize machine learning to identify the resolution provided by the user and implement the resolution for any similar future transfer conflicts that occur.

Figure 4:
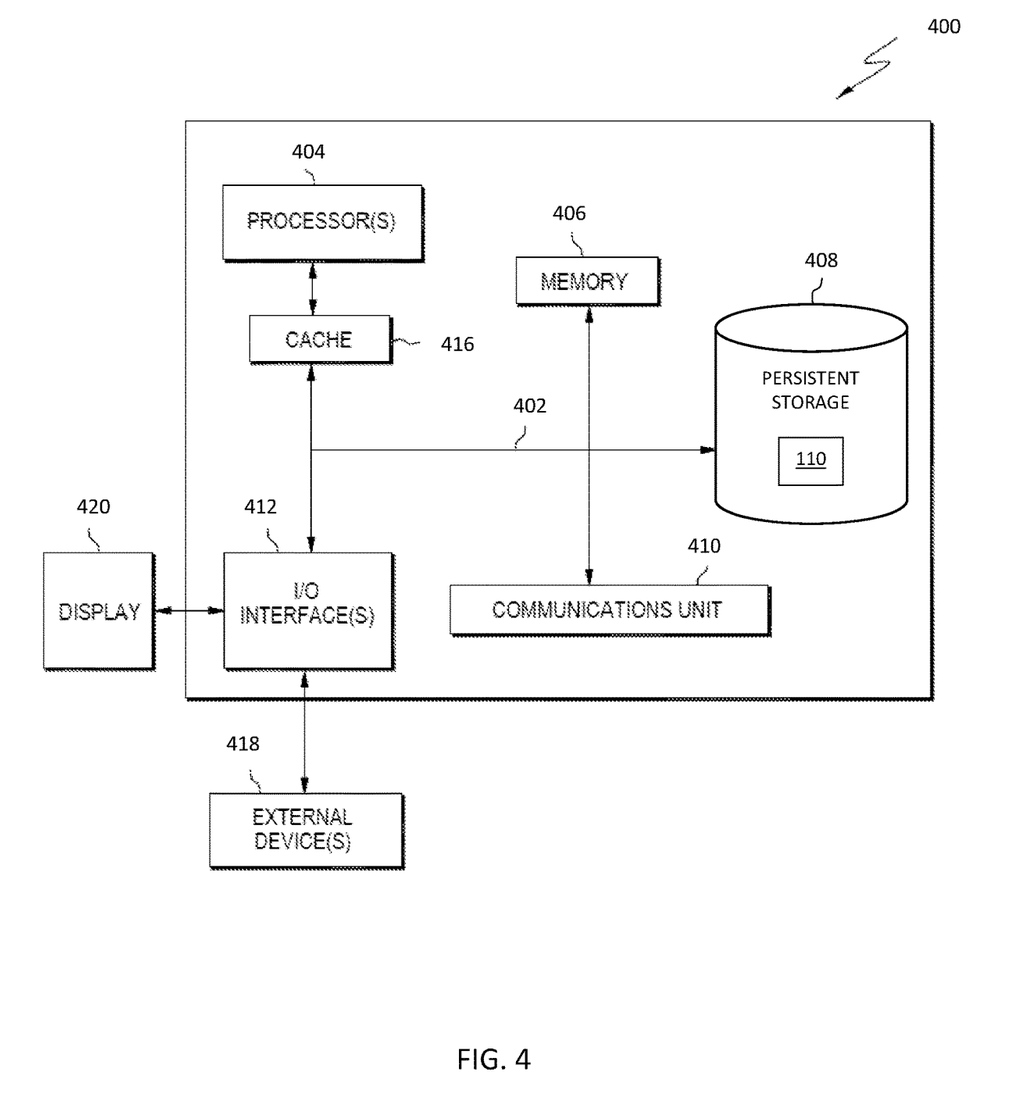
FIG. 4 is a block diagram of components of a computer system, such as the server computer of FIG. 1, in accordance with an embodiment of the present invention.

FIG. 4 depicts computer system 400, where server computer 102, originative device 104, and receiving device 106 are each an example of a computer system 400 that includes content transfer program 110. The computer system includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
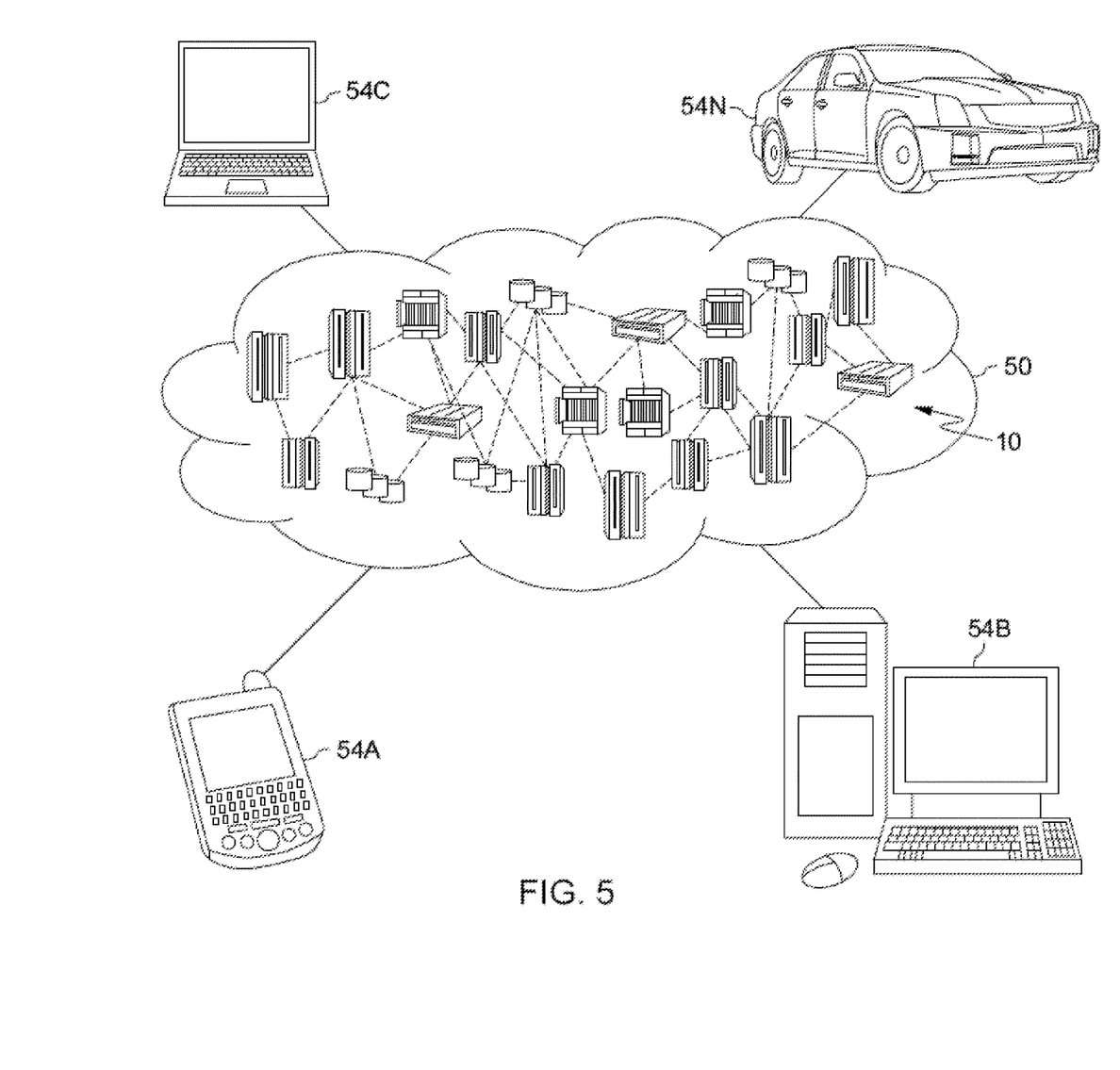
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
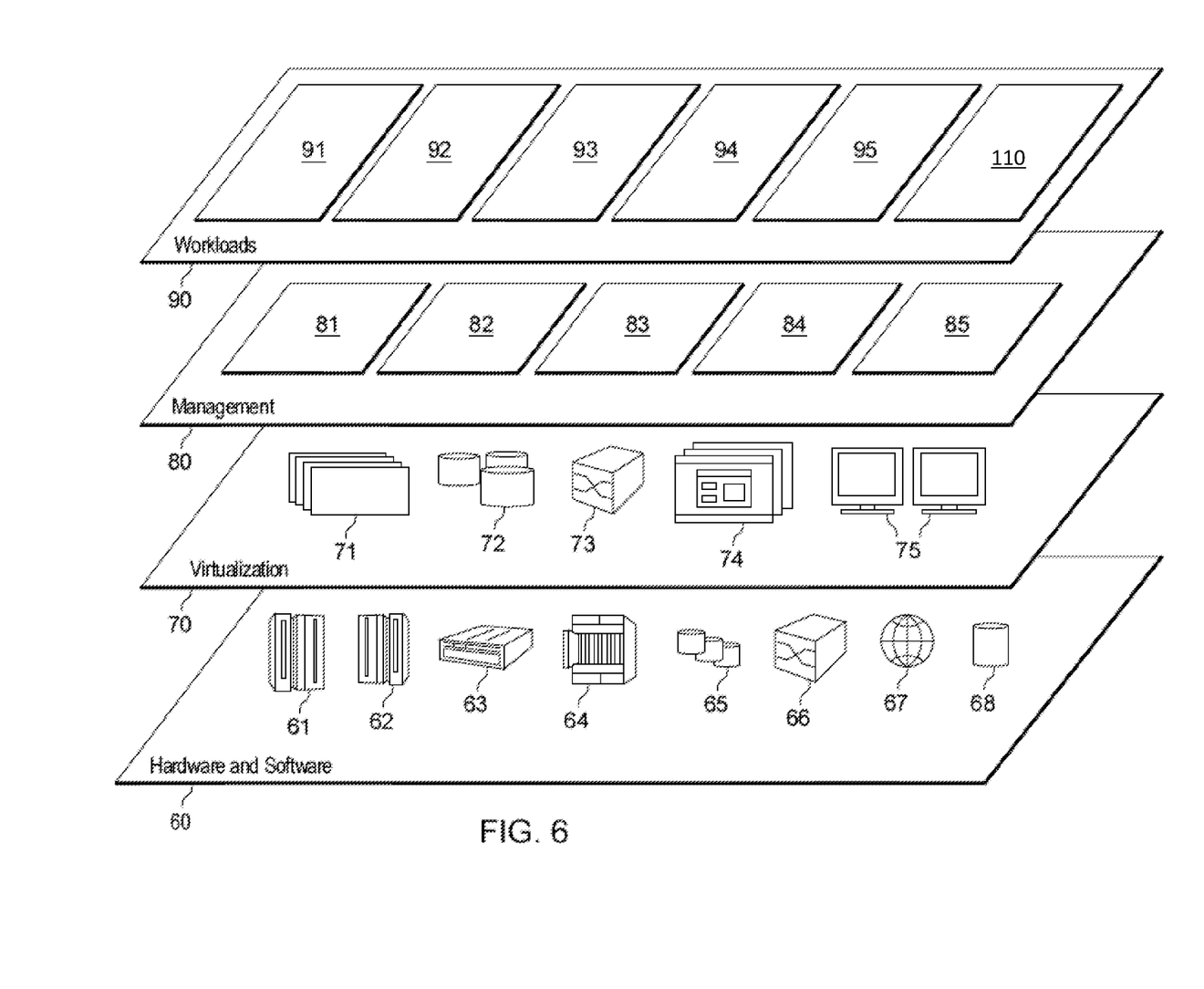
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content transfer program 110.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving a content selection for transferring from an originating device;
   determining contextual positioning for each portion of a plurality of portions of the content selection in a user interface of the originating device, wherein the contextual positioning is based on the content selection and one or more objects in the user interface of the originating device;
   sending, to a receiving device, the plurality of portions of the content selection with the determined contextual positioning in the user interface of the originating device;
   determining whether a transfer conflict is present for a first portion of the plurality of portions of the content selection, wherein the transfer conflict prevents the first portion of the plurality of portions of the content selection from being placed into the user interface of the receiving device;
   responsive to determining the transfer conflict is present for the first portion of the plurality of portions of the content selection, receiving, at the originating device, a user specified position for the first portion of the plurality of portions of the content selection in the user interface of the receiving device; and
   placing, in a user interface of the receiving device, the first portion of the plurality of portions of the content selection based on the user specified position and a remaining portion of the plurality of portions of the content selection based on the determined contextual positioning in the user interface of the originating device relative to one or more objects in the user interface of the receiving device.

2. The computer-implemented method of claim 1, further comprises:
   identifying the receiving device for the content selection based on an identified pattern of previous content selection transfers between the originating device and the receiving device.

3. The computer-implemented method of claim 1, further comprising:
   displaying, in the user interface of the originating device, an overlay window with the user interface of the receiving device, wherein the user can input the user specified position for the first portion of the plurality of portions of the content selection in the overlay window.

4. The computer-implemented method of claim 1, further comprises:
   determining the first portion of the plurality of portions of the content selection with the determined contextual positioning does not match the one or more objects in the user interface of the receiving device.

5. The computer-implemented method of claim 1, further comprises:
   determining existing content is present in an area of the user interface of the receiving device in which the first portion of the plurality of portions of the content selection is placeable.

6. The computer-implemented method of claim 1, further comprises:
   determining the first portion of the plurality of portions of the content selection exceeds a size for placement in an area of the user interface of the receiving device, wherein the size is based one or more of: dimensions, file size, and number of text characters.

7. A computer program product comprising one or more computer readable storage media and program instructions collectively stored on the one or more computer readable storage media, the stored program instructions executable by one or more computer processors, the stored program instructions comprising:
   program instructions to receive a content selection for transferring from an originating device;
   program instructions to determine contextual positioning for each portion of a plurality of portions of the content selection in a user interface of the originating device, wherein the contextual positioning is based on the content selection and one or more objects in the user interface of the originating device;
   program instructions to send, to a receiving device, the plurality of portions of the content selection with the determined contextual positioning in the user interface of the originating device;
   program instructions to determine whether a transfer conflict is present for a first portion of the plurality of portions of the content selection, wherein the transfer conflict prevents the first portion of the plurality of portions of the content selection from being placed into the user interface of the receiving device;
   program instructions to, responsive to determining the transfer conflict is present for the first portion of the plurality of portions of the content selection, receive, at the originating device, a user specified position for the first portion of the plurality of portions of the content selection in the user interface of the receiving device; and
   program instructions to place, in a user interface of the receiving device, the first portion of the plurality of portions of the content selection based on the user specified position and a remaining portion of the plurality of portions of the content selection based on the determined contextual positioning in the user interface of the originating device relative to one or more objects in the user interface of the receiving device.

8. The computer program product of claim 7, wherein the stored program instructions further comprises:
   program instructions to identify the receiving device for the content selection based on an identified pattern of previous content selection transfers between the originating device and the receiving device.

9. The computer program product of claim 7, wherein the stored program instructions further comprises:
   program instructions to display, in the user interface of the originating device, an overlay window with the user interface of the receiving device, wherein the user can input the user specified position for the first portion of the plurality of portions of the content selection in the overlay window.

10. The computer program product of claim 7, wherein the stored program instructions further comprises:
    program instructions to determine the first portion of the plurality of portions of the content selection with the determined contextual positioning does not match the one or more objects in the user interface of the receiving device.

11. The computer program product of claim 7, wherein the stored program instructions further comprises:
    program instructions to determine existing content is present in an area of the user interface of the receiving device in which the first portion of the plurality of portions of the content selection is placeable.

12. The computer program product of claim 7, the stored program instructions further comprising:
    program instructions to determine the first portion of the plurality of portions of the content selection exceeds a size for placement in an area of the user interface of the receiving device, wherein the size is based one or more of: dimensions, file size, and number of text characters.

13. A computer system comprising:
    one or more computer processors;
    one or more computer readable storage media; and
    program instructions stored on the computer readable storage media for execution by at least one of the one or more computer processors, the program instructions comprising:
    program instructions to receive a content selection for transferring from an originating device;
    program instructions to determine contextual positioning for each portion of a plurality of portions of the content selection in a user interface of the originating device, wherein the contextual positioning is based on the content selection and one or more objects in the user interface of the originating device;
    program instructions to send, to a receiving device, the plurality of portions of the content selection with the determined contextual positioning in the user interface of the originating device;
    program instructions to determine whether a transfer conflict is present for a first portion of the plurality of portions of the content selection, wherein the transfer conflict prevents the first portion of the plurality of portions of the content selection from being placed into the user interface of the receiving device;
    program instructions to, responsive to determining the transfer conflict is present for the first portion of the plurality of portions of the content selection, receive, at the originating device, a user specified position for the first portion of the plurality of portions of the content selection in the user interface of the receiving device; and
    program instructions to place, in a user interface of the receiving device, the first portion of the plurality of portions of the content selection based on the user specified position and a remaining portion of the plurality of portions of the content selection based on the determined contextual positioning in the user interface of the originating device relative to one or more objects in the user interface of the receiving device.

14. The computer system of claim 13, wherein the stored program instructions further comprises:
    program instructions to identify the receiving device for the content selection based on an identified pattern of previous content selection transfers between the originating device and the receiving device.

15. The computer system of claim 13, wherein the stored program instructions further comprises:
    program instructions to display, in the user interface of the originating device, an overlay window with the user interface of the receiving device, wherein the user can input the user specified position for the first portion of the plurality of portions of the content selection in the overlay window.

16. The computer system of claim 13, wherein the stored program instructions further comprises:

program instructions to determine the first portion of the plurality of portions of the content selection with the determined contextual positioning does not match the one or more objects in the user interface of the receiving device.

17. The computer systems of claim 13, wherein the stored program instructions further comprises:

program instructions to determine existing content is present in an area of the user interface of the receiving device in which the first portion of the plurality of portions of the content selection is placeable.

18. The computer systems of claim 13, wherein the stored program instructions further comprises:

program instructions to determine the first portion of the plurality of portions of the content selection exceeds a size for placement in an area of the user interface of the receiving device, wherein the size is based one or more of: dimensions, file size, and number of text characters.

* * * * *